(12) United States Patent
Park et al.

(10) Patent No.: US 7,877,624 B2
(45) Date of Patent: Jan. 25, 2011

(54) FAULTED CIRCUIT INDICATOR MONITORING DEVICE WITH WIRELESS MEMORY MONITOR

(75) Inventors: Douglas A. Park, Palouse, WA (US); Witold R. Teller, Pullman, WA (US); Luther S. Anderson, Pullman, WA (US); Steven A. McMahon, Clarkston, WA (US); Donald C. Hicks, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 817 days.

(21) Appl. No.: 11/750,932

(22) Filed: May 18, 2007

(65) Prior Publication Data

US 2008/0010528 A1 Jan. 10, 2008

Related U.S. Application Data

(60) Provisional application No. 60/802,218, filed on May 19, 2006.

(51) Int. Cl.
*G06F 11/00* (2006.01)
(52) U.S. Cl. .......................................... 714/1
(58) Field of Classification Search ........................ 714/1
See application file for complete search history.

(56) References Cited

U.S. PATENT DOCUMENTS

| 2,379,664 | A | 7/1945 | Stanko |
| 2,928,048 | A | 3/1960 | Postal |
| 2,967,267 | A | 1/1961 | Steinman |
| 3,292,579 | A | 12/1966 | Buchanan |
| 3,296,493 | A | 1/1967 | Whittaker |
| 3,476,997 | A | 11/1969 | Otzipka |
| 3,525,903 | A | 8/1970 | Morris |
| 3,621,334 | A | 11/1971 | Burns |
| 3,676,740 | A | 7/1972 | Schweitzer |

(Continued)

OTHER PUBLICATIONS

Sun Microelectronics, "Introduction to JTAG Boundary Scan", Jan. 1997, http://www.engr.udayton.edu/faculty/jloomis/ece446/jtag/jtag1.html.*

(Continued)

*Primary Examiner*—Michael C Maskulinski
(74) *Attorney, Agent, or Firm*—Eugene M. Cummings, P.C.

(57) ABSTRACT

A wireless communications system for viewing and modifying memory locations within a power system device is provided including a wireless device and a power system device. The wireless device includes an input mechanism adapted to accept input from a user indicating a memory location the user wishes to view; a first radio frequency transmitter for transmitting a first signal including the memory location within the power system device the user wishes to view; and a first radio frequency receiver for receiving a second signal. The power system device includes at least one randomly accessible memory location and a processor coupled to at least one randomly accessible memory location; a second radio frequency receiver coupled to the processor and a second radio frequency transmitter coupled to the processor for receiving the first signal. The processor retrieves the value of the memory location included within the first signal and activates the second radio frequency transmitter to transmit a second signal including the value of the memory location. The value of the memory location may be a command or control that is executed by the power system device.

17 Claims, 4 Drawing Sheets

U.S. PATENT DOCUMENTS

| | | |
|---|---|---|
| 3,702,966 A | 11/1972 | Schweitzer |
| 3,708,724 A | 1/1973 | Schweitzer |
| 3,715,742 A | 2/1973 | Schweitzer |
| 3,781,682 A | 12/1973 | Schweitzer |
| 3,816,816 A | 6/1974 | Schweitzer |
| 3,866,197 A | 2/1975 | Schweitzer |
| 3,876,911 A | 4/1975 | Schweitzer |
| 3,906,477 A | 9/1975 | Schweitzer |
| 3,972,581 A | 8/1976 | Oldham |
| 3,974,446 A | 8/1976 | Schweitzer |
| 4,029,951 A | 6/1977 | Berry |
| 4,034,360 A | 7/1977 | Schweitzer |
| 4,038,625 A | 7/1977 | Tompkins |
| 4,045,726 A | 8/1977 | Schweitzer |
| 4,063,171 A | 12/1977 | Schweitzer |
| 4,086,529 A | 4/1978 | Schweitzer |
| 4,112,292 A | 9/1978 | Varvel |
| 4,144,485 A | 3/1979 | Akita |
| 4,165,528 A | 8/1979 | Schweitzer |
| 4,186,986 A | 2/1980 | Shoemaker |
| 4,199,741 A | 4/1980 | Serrus Paulet |
| 4,234,847 A | 11/1980 | Schweitzer |
| 4,251,770 A | 2/1981 | Schweitzer |
| 4,288,743 A | 9/1981 | Schweitzer |
| 4,375,617 A | 3/1983 | Schweitzer |
| 4,414,543 A | 11/1983 | Schweitzer |
| 4,424,512 A | 1/1984 | Schweitzer |
| 4,438,403 A | 3/1984 | Schweitzer |
| 4,458,198 A | 7/1984 | Schweitzer |
| 4,495,489 A | 1/1985 | Schweitzer |
| 4,536,758 A | 8/1985 | Schweitzer |
| 4,686,518 A | 8/1987 | Schweitzer |
| 4,689,752 A | 8/1987 | Fernandes |
| 4,709,339 A | 11/1987 | Fernandes |
| 4,794,332 A | 12/1988 | Schweitzer |
| 4,795,982 A | 1/1989 | Schweitzer |
| 4,829,298 A | 5/1989 | Fernandes |
| 4,940,976 A | 7/1990 | Gastouniotis |
| 4,996,624 A | 2/1991 | Schweitzer |
| 5,008,651 A | 4/1991 | Schweitzer |
| 5,038,246 A | 8/1991 | Durivage |
| 5,070,301 A | 12/1991 | Schweitzer |
| 5,089,928 A | 2/1992 | Durivage |
| 5,136,457 A | 8/1992 | Durivage |
| 5,136,458 A | 8/1992 | Durivage |
| 5,150,361 A | 9/1992 | Wieczorek |
| 5,153,565 A | 10/1992 | Schweitzer |
| 5,168,414 A | 12/1992 | Horstmann |
| 5,196,682 A | 3/1993 | Englehardt |
| 5,220,311 A | 6/1993 | Schweitzer |
| 5,298,894 A | 3/1994 | Cerney |
| 5,420,502 A | 5/1995 | Schweitzer |
| 5,438,329 A | 8/1995 | Gastouniotis |
| 5,495,239 A | 2/1996 | Ouellete |
| 5,519,527 A | 5/1996 | Panton |
| 5,550,476 A | 8/1996 | Lau |
| 5,565,783 A | 10/1996 | Lau |
| 5,648,726 A | 7/1997 | Le |
| 5,656,931 A | 8/1997 | Lau et al. |
| 5,659,300 A | 8/1997 | Dresselhuys |
| 5,677,623 A | 10/1997 | Schweitzer |
| 5,677,678 A | 10/1997 | Schweitzer |
| 5,701,121 A | 12/1997 | Murdoch |
| 5,726,646 A | 3/1998 | Bane |
| 5,793,214 A | 8/1998 | Wakamatsu |
| 5,821,869 A | 10/1998 | Schweitzer |
| 5,825,303 A | 10/1998 | Bloss |
| 5,877,703 A | 3/1999 | Bloss, Jr. et al. |
| 5,889,399 A | 3/1999 | Schweitzer |
| 6,002,260 A | 12/1999 | Lau |
| 6,014,301 A | 1/2000 | Schweitzer |
| 6,016,105 A | 1/2000 | Schweitzer |
| 6,029,061 A | 2/2000 | Kohlschmidt |
| 6,072,405 A | 6/2000 | Sears |
| 6,078,785 A | 6/2000 | Bush |
| 6,133,724 A | 10/2000 | Schweitzer |
| 6,177,883 B1 | 1/2001 | Jannetti |
| 6,188,216 B1 | 2/2001 | Fromer |
| 6,239,722 B1 | 5/2001 | Colton |
| 6,326,905 B1 | 12/2001 | Walters |
| 6,349,248 B1 | 2/2002 | Dean |
| 6,366,217 B1 | 4/2002 | Cunningham |
| 6,380,733 B1 | 4/2002 | Apel |
| 6,414,605 B1 | 7/2002 | Walden |
| 6,429,661 B1 | 8/2002 | Schweitzer |
| 6,433,698 B1 | 8/2002 | Schweitzer |
| 6,479,981 B2 | 11/2002 | Schweitzer |
| 6,525,504 B1 | 2/2003 | Nygren |
| 6,573,707 B2 | 6/2003 | Kiriyama |
| 6,577,608 B1 | 6/2003 | Moon |
| 6,617,976 B2 | 9/2003 | Walden |
| 6,671,824 B1 | 12/2003 | Hyland |
| 6,736,646 B2 | 5/2004 | Takahashi |
| 6,753,792 B2 | 6/2004 | Beckwth |
| 6,759,933 B2 | 7/2004 | Fallak |
| 6,796,821 B2 | 9/2004 | Cairns |
| 6,798,211 B1 | 9/2004 | Rockwell |
| 6,828,906 B2 | 12/2004 | Malcolm |
| 6,944,555 B2 | 9/2005 | Blackett |
| 6,980,091 B2 | 12/2005 | White |
| 7,391,299 B2 | 6/2008 | Bender |
| 7,495,574 B2 * | 2/2009 | Rocamora et al. ............ 340/638 |
| 2002/0089802 A1 | 7/2002 | Beckwth |
| 2003/0040897 A1 | 2/2003 | Murphy |
| 2003/0119568 A1 | 6/2003 | Menard |
| 2003/0153368 A1 | 8/2003 | Bussan |
| 2003/0174067 A1 | 9/2003 | Soliman |
| 2003/0178290 A1 | 9/2003 | Schilling |
| 2003/0179149 A1 | 9/2003 | Savage |
| 2004/0005809 A1 | 1/2004 | Suzuki |
| 2004/0032340 A1 | 2/2004 | Lingafeldt |
| 2004/0036478 A1 | 2/2004 | Logvinov |
| 2004/0067366 A1 | 4/2004 | Gorczyca |
| 2004/0113810 A1 | 6/2004 | Mason |
| 2004/0214616 A1 | 10/2004 | Malcom |
| 2004/0233159 A1 | 11/2004 | Badarneh |
| 2005/0040809 A1 | 2/2005 | Uber |
| 2005/0068193 A1 | 3/2005 | Osterloh |
| 2005/0068194 A1 | 3/2005 | Schleich |
| 2005/0079818 A1 | 4/2005 | Atwater |
| 2005/0087599 A1 | 4/2005 | Ward |
| 2005/0110656 A1 | 5/2005 | Patterson |
| 2005/0132115 A1 | 6/2005 | Leach |
| 2005/0151659 A1 | 7/2005 | Donovan |
| 2005/0205395 A1 | 9/2005 | Dietrich |
| 2005/0215280 A1 | 9/2005 | Twitchell, Jr. |
| 2006/0084419 A1 | 4/2006 | Rocamora |
| 2006/0179374 A1 * | 8/2006 | Noble ..................... 714/727 |
| 2007/0005842 A1 * | 1/2007 | Sohm et al. .................. 710/62 |
| 2007/0179547 A1 | 8/2007 | Armstrong |

OTHER PUBLICATIONS

Radio Faulted Circuit Indicator System by Joslyn Hi-Voltage, www.joslynhivoltage.com, Fisher Pierce 1999.

Fisher Priece Division of Pacific Scientific—Faulted Circuit Indicators—Technical Applications Data 1995; Anh Le, Dave Donovan, Bill Doherty.

Power Mangement Using the Embedded Stand-Alone Wake-Up Protocol. Rev. 2 (Aug. 2002); ATMEL AT86RF211.

Radio Receivers Series 1560 Handheld or RTU/SCADA—Joslyn Hi-Voltage—http://www.joslynhivoltage.com/cat1560.htm and http://www.joslynhivoltage.com/spec1560.htm, 2001.

400 Series Buccaneer—Bulgin—www.bulgin.com.uk, Jan. 26, 2005.

V Series—Lemo, 2007.

Fisher Pierce—Radio Faulted Circuit Indicator System—(1999)—Joslyn Hi-Voltage http://www.joslynhivoltage.com/PDFFiles/RFCI.pdf.

* cited by examiner

FAULTED CIRCUIT INDICATOR MONITORING DEVICE WITH WIRELESS MEMORY MONITOR

CROSS-REFERENCE TO RELATED APPLICATIONS

This application claims benefit under 35 U.S.C. §119(e) of United States Provisional Application entitled "FAULTED CIRCUIT INDICATOR WITH WIRELESS MEMORY MONITOR," filed on May 19, 2006 having Ser. No. 60/802,218, naming Douglas A. Park, Witold Teller, Donald C. Hicks, Luther S. Anderson, and Steven A. McMahon as inventors, the complete disclosure thereof being incorporated by reference.

FIELD OF THE INVENTION

The present invention relates generally to systems, methods and apparatuses for wirelessly interfacing with a power system protection, control, or measuring device, and more particularly to systems, methods and apparatus for wirelessly viewing and modifying memory locations within a power system protection, control, or measuring device.

DESCRIPTION OF THE PRIOR ART

Power transmission and distribution systems may include power system protection, monitoring, and control devices such as protective relays, faulted circuit indicators, and the like. Throughout, the term "power system device" will include any power system protection, monitoring, or control device. Faulted circuit indicators (FCIs) play a vital role in detecting and indicating faults and locations of faulted conductors to decrease the duration of power outages and improve the reliability of power systems throughout the world. Electrical utilities depend on faulted circuit indicators to help their employees quickly locate faulted conductors. Most conventional faulted circuit indicators utilize a mechanical target or an LED to provide a visual indication of a faulted conductor. By visually scanning faulted circuit indicators located at a site, an electrical utility crew can quickly locate a fault. Industry statistics indicate that faulted circuit indicators reduce fault location time by 50%-60% versus the use of manual techniques, such as the "refuse and sectionalize" method, Nonetheless, electrical utilities still spend substantial amounts of time and money determining the locations of faults on their networks.

Electrical utilities rely on a number of additional techniques to further decrease time spent locating faults. For instance, modern faulted circuit indicators frequently have one or more contact outputs that activate on the detection of a fault. These contact outputs can be connected to a Supervisory Control and Data Acquisition ("SCADA") system, allowing remote monitoring of a given faulted circuit indicator's status. This technique works well for above-ground sites, where a cable from the faulted circuit indicator to a monitoring device can be installed, and the monitoring device can be connected to a remote site by a communications line. However, this technique is expensive for underground sites, where an underground communications line must be installed.

Another recent advancement is the use of radio frequency ("RF") technology within fault circuit indication systems. In one prior art system, each faulted circuit indicator contains a two-way radio that communicates the occurrence of a fault to an intelligent module installed within 100 feet of the faulted circuit indicator. The intelligent module then uses the existing telephone network to communicate a fault occurrence to a remote site, triggering the dispatch of a team to the fault site. However, this system is vulnerable to phone network outages. In addition, a crew dispatched to the fault site must then monitor a readout located on the intelligent module to ensure that the fault has been properly cleared. As the intelligent modules are frequently located on power line poles, viewing an intelligent module's readout may be inconvenient.

An improvement on this system is the use of a wireless device to monitor radio signals from RF equipped faulted circuit indicators. Using a wireless device, a utility crew can quickly locate a fault and determine when the fault has been properly cleared by monitoring the display of the wireless device.

The technology within faulted circuit indicators has also improved. Primitive electromechanical units gave way to more sophisticated analog electronic units, which have given way to microprocessor driven units. Modern faulted circuit indicators utilize sophisticated algorithms both to detect faults and conserve battery life. In addition, faulted circuit indicators may be connected to other "monitoring" units which also use microprocessor based algorithms. However, as more sophisticated microprocessor based algorithms have been introduced, problems with the implementation of the algorithms have escaped detection until deployment in the field. Therefore, methods to troubleshoot defects in the field have become more important.

The traditional way to troubleshoot a microprocessor based device is through the use of a debugger. A debugger is a program that runs concurrently with another program and monitors the other program. Simple debuggers allow the user to stop execution of the embedded software and view and manipulate memory locations. More sophisticated debuggers allow a user to stop execution of the monitored program at a desired time, say at the execution of a particular instruction or the occurrence of a particular condition, and monitor the status of the computer on which the program is running. Status information may include the contents of memory, the status of microprocessor pins, the value of registers, and other information. In addition, debuggers also allow users to step through instructions and view how status information within the computer changes.

Debugging embedded systems, such as faulted circuit indicators and faulted circuit indicator monitors, once they have been deployed can present special challenges. Generally, a separate computer running the debugger must be attached to the embedded device through a debugging port. Through the years a number of different debugging ports have been developed. Two of the most commonly used are RS232 and IEEE1149.1 (IEEE stands for the Institute of Electrical and Electronic Engineers, where 1149.1 refers to a particular standard that is alternatively known as "JTAG"). RS232 is a standard serial communications port. A debugger using an RS232 port relies on special software running on the embedded system that will respond to debugging commands sent over the RS232 port. The debugging software running on the embedded system is often referred to as "monitor software." Because of this, debuggers relying on RS232 ports are vulnerable to defects in the embedded system software that may cause the monitor software to cease execution.

IEEE1149.1 addresses many of the problems with RS232 based debugging software. IEEE1149.1 relies on custom hardware built into the embedded microprocessor. This custom hardware includes a collection of pins that form a port, as well as custom hardware within the microprocessor that responds to commands sent over the port. The use of JTAG alleviates the risk of a crash in the embedded system software, which terminates the ability to continue debugging the embedded system.

Both RS232 and IEEE1149.1 require the use of a wired connection between a debugging computer and the embedded device. As many faulted circuit indicators and faulted circuit indicator monitors are deployed in underground locations where deep standing water is frequently present, field debugging using a wired connection is often inconvenient or even untenable.

Accordingly, it is an object of the invention to provide a simple wireless debugging tool for a faulted circuit indicator monitor allowing a user to view the contents of the faulted circuit indicator monitor's memory and to modify the contents of the faulted circuit indicator monitor's memory. Summary of the Invention The present invention achieves its objective through the use of a wireless communications system for viewing memory locations within a power system device. The system includes a wireless device with an input mechanism, which the user may use to indicate memory locations that the user wishes to view. The wireless device also includes a radio frequency transmitter, which is used to transmit a message to the power system device containing the memory locations the user wishes to view. The power system device, on receiving the message through a radio frequency receiver, retrieves the selected memory locations using its microprocessor and generates a response message including the contents of the memory locations selected by the user. The message is then transmitted through a radio frequency transmitter within the power system device to the wireless device, where it is displayed on a display.

In another embodiment, the present invention encompasses a system for wirelessly modifying memory locations within a power system device. The system includes a wireless device with an input mechanism, which the user may use to indicate memory locations that the user wishes to modify as well as the values that the user wishes to input into those locations. The wireless device also includes a radio frequency transmitter, which is used to transmit a message to the power system device containing the selected memory locations as well as the desired contents of those memory locations. The power system device, on receiving the message through a radio frequency receiver, uses an embedded microprocessor to modify the selected memory locations with the new values selected by the user.

BRIEF DESCRIPTION OF THE DRAWINGS

Although the characteristic features of this invention will be particularly pointed out in the claims, the invention itself, and the manner in which it can be made and used, can be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
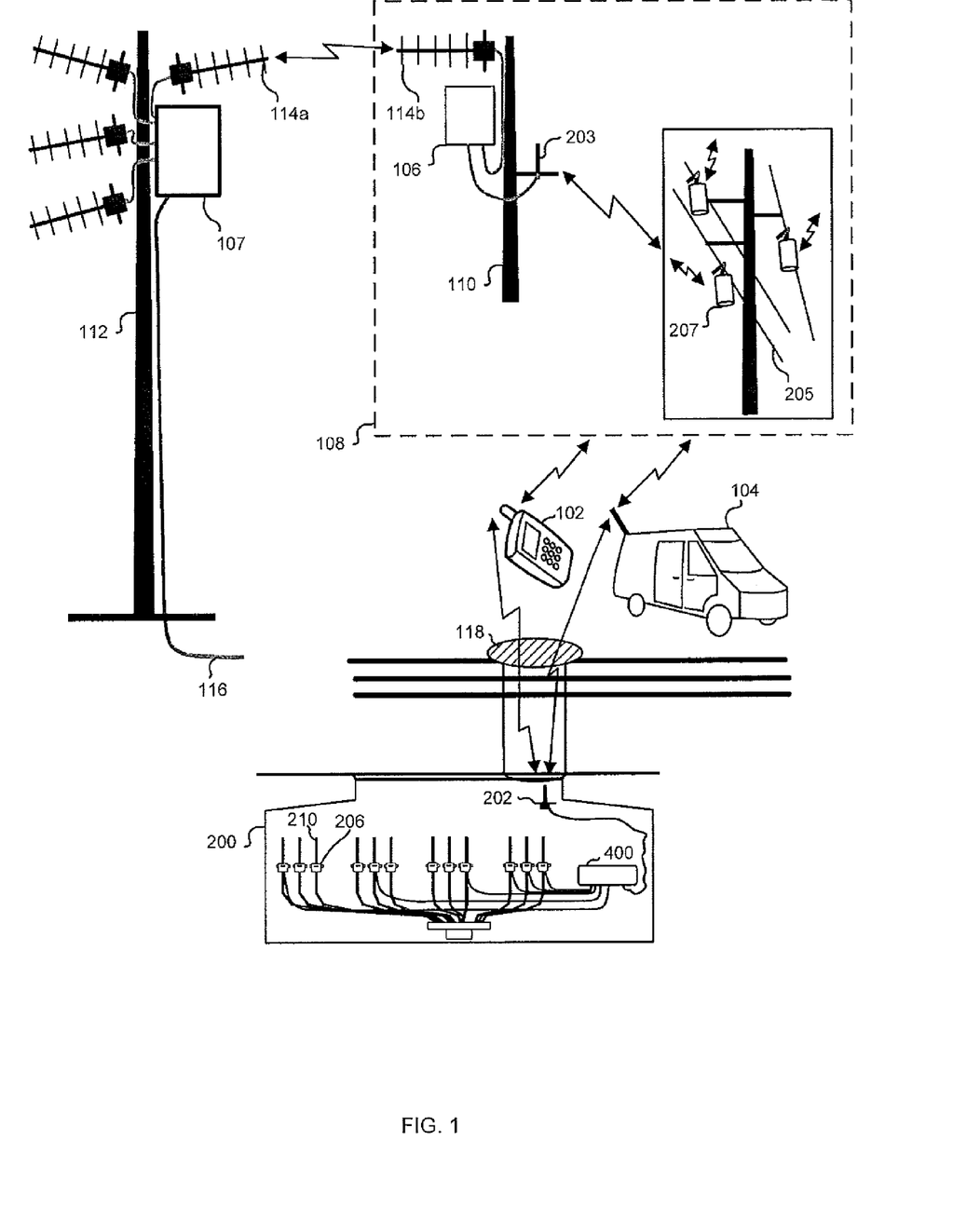
FIG. 1 illustrates a system view of a faulted circuit indicator monitoring system.

FIG. 1 illustrates a faulted circuit indicator monitoring system in accordance with the present invention. A number of overhead faulted circuit indicators 207 each contain a two-way radio that communicates the occurrence of a fault via a short range antenna 203 to a local site 110 having an intelligent module 106 installed near the faulted circuit indicators 207. The intelligent module then uses the existing wired telephone network (not shown) or a long range RF antenna 114b to communicate the fault occurrence to a remote site 112 via another long range RF antenna 114a. The remote site 112 includes a remote module 107, which is connected to another site (not shown) via a wired connection 116. When a fault is detected by a faulted circuit indicator, the occurrence is communicated in the manner described above to the remote site 112, triggering the dispatch of a team to the fault site. The fault team then uses a wireless device 102 or equipment installed in a vehicle 104 to determine precisely which conductor 205 is faulted. Note that the conductors could also be underground 200 and only accessible through an access port (e.g. a manhole) 118. Faulted circuit indicators 206 attached to the underground conductors are wired to a radio interface unit 400 with a separate short range antenna 202 to communicate with the wireless device 102 (e.g., a wireless handheld device). In another embodiment, the wireless device may be installed in a vehicle 104.

Figure 2:
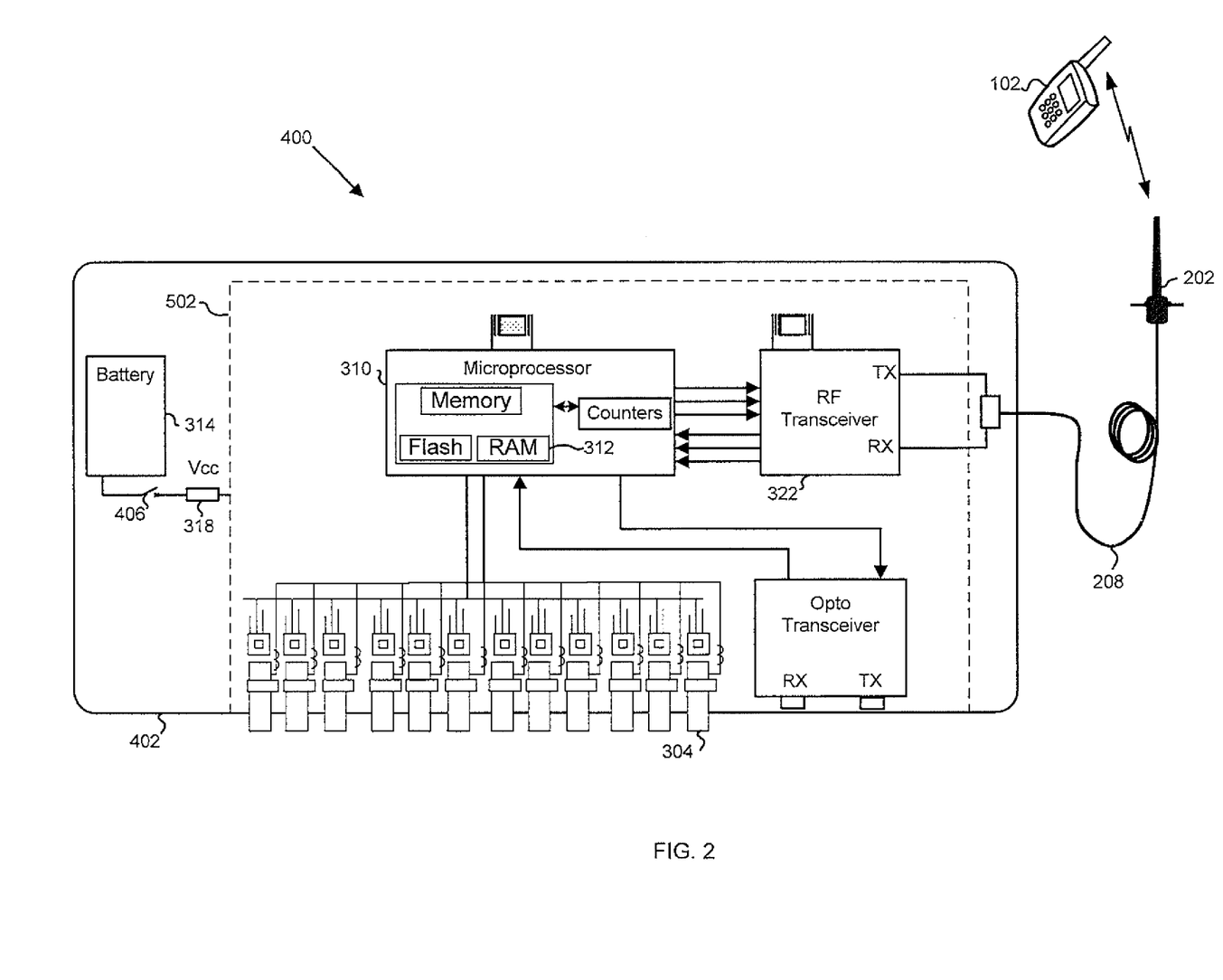
FIG. 2 illustrates a system view of a wireless device debugging a number of faulted circuit indicator monitors connected to a number of faulted circuit indicators in accordance with an aspect of the present invention.

Referring to the drawings, and to FIG. 2 in particular, a wireless device communicates with a monitor connected to a number of power system devices. For illustration purposes only, the wireless device is in the form of a handheld device whereas the power system devices are in the form of underground faulted circuit indicators (not shown). The wireless device generally communicates through a radio frequency faulted circuit indicator monitor 400. The faulted circuit indicator monitor 400 includes a housing 402. A number of probe cavities 304 for connecting faulted circuit indicators (not shown) protrude from the housing 402. The radio frequency faulted circuit indicator monitor 400 also includes a microprocessor 310 with some amount of randomly accessible memory 312 (e.g., any type of randomly accessible memory, such as SRAM, DRAM, internal registers, FLASH, etc.). Note that the memory need not be integrated within the microprocessor. The microprocessor is coupled to an RF transceiver 322, which is coupled to an antenna 202 directly or via a radio frequency cable 208. The radio frequency faulted circuit indicator monitor 400 communicates with a wireless device 102. A wide variety of wireless communications protocols could be used, such as 802.11. The particular wireless communications protocol used is not significant to this invention, and as wireless communications protocols are well known in the art, no such protocol is described.

Turning to FIG. 3, possible data formats for messages used to monitor and modify memory locations within the radio frequency faulted circuit indicator monitor are detailed. The "peek request" message 600 of FIG. 3A is sent by the wireless device to the radio frequency faulted circuit indicator monitor, and is used to retrieve the contents of a particular memory location or range of memory locations within the radio frequency faulted circuit indicator monitor. In the illustrated embodiment, the peek request message 600 contains a header 602 with data identifying the desired message (i.e.; peek request), and may include information (e.g. an identification number of the faulted circuit indicator monitor) about the sending unit and/or the receiving unit. In addition, the illustrated peek request message 600 contains a field with the start address 604 of the data the user wishes to view as well as the number of bytes 606 starting at the start address 604 that the user wishes to view. To ensure reliability, the peek request message may also contain a cyclical redundancy check (CRC) 608, which is used to validate the contents of the message. Alternatively, the peek request message could use a different means for data validation, such as a checksum or parity bit.

Figure 3A:
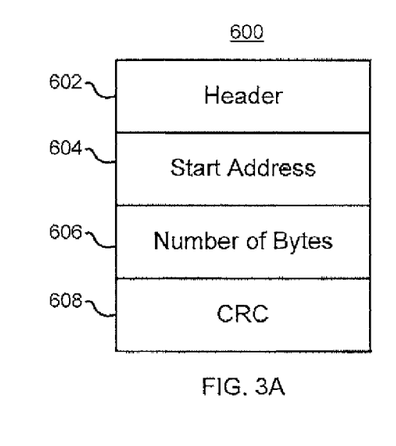
FIG. 3 illustrates the data format of peek and poke messages used to read and modify memory locations within a radio frequency faulted circuit indicator monitor in accordance with an aspect of the present invention.
Figure 3B:
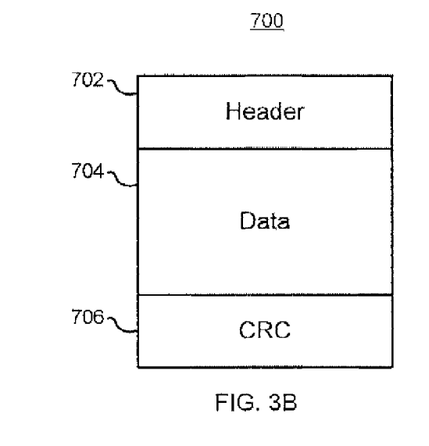

FIG. 3B illustrates a "peek response" message 700, which contains the data requested by the peek request message. In the illustrated embodiment, the peek response message contains a header 702, with information identifying the message as a peek response, as well as information about the sending and/or receiving unit. In addition, the peek response message contains a data payload 704, with the contents of the memory locations requested. To ensure reliability, the peek response message may contain a CRC 706, which is used to validate the contents of the message. Alternatively, the peek response message could use a different means for data validation, such as a checksum or parity bit. The peek response message may also include the status of the faulted circuit indicator monitor, which may include, for example, a result from a self test such as a memory (RAM and/or flash memory) test, the expected useful life expectancy, battery usage, and the like.

Figure 3C:
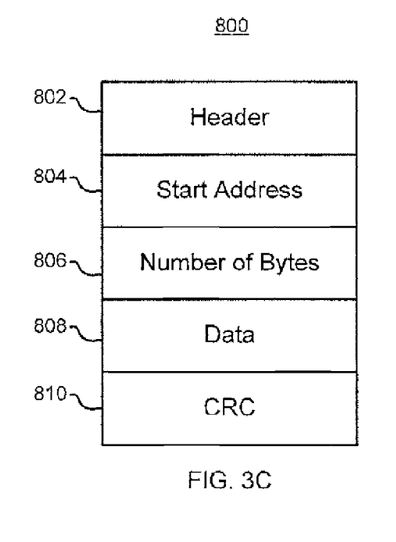

FIG. 3C illustrates a "poke request" message 800, which is used to modify memory locations in the faulted circuit indicator or faulted circuit indicator monitor. In the illustrated embodiment, the poke request message 800 contains a header 802, with information identifying the message as a poke request, as well as information about the sending and/or receiving unit. In addition, the poke request message 800 contains a start address 804, which identifies the address or range of addresses the user wishes to modify. The poke request message also contains a field with the number of bytes 806 to modify, as well as a data field 808 containing the bytes to be put into the address or range of addresses. Note that another scheme to identify the particular memory location or range of memory locations would work just as well. Finally, the poke request message may contain a CRC 810, which is used to validate the contents of the message. Alternatively, the poke request message could use a different means for data validation, such as a checksum or parity bit.

The poke request message could also be used to initiate a control or command in the faulted circuit indicator or faulted circuit indicator monitor. In this embodiment, the poke request message 800 may include a start address 804 which indicates to the faulted circuit indicator or faulted circuit indicator monitor that the data 808 includes a command or control. The data may indicate to the faulted circuit indicator or faulted circuit indicator monitor to undergo any of the available commands or controls on the faulted circuit indicator or faulted circuit indicator monitor, such as, for example, a Power on Reset (POR) which resets all faulted circuit indicator latches to a closed state. Another example of a command or control is requiring the faulted circuit indicator or faulted circuit indicator monitor to undergo a complete FLASH and RAM self test. The command or control may require the faulted circuit indicator or faulted circuit indicator monitor to undergo a system test and write the results to a particular address, which may be later viewed using a peek request. Other commands or controls may require the faulted circuit indicator or faulted circuit indicator monitor to undergo an update of Data Flash, extend operating modes, decrease operating modes, or change a state of operation.

Figure 3D:
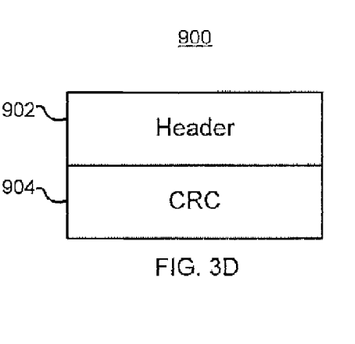

FIG. 3D illustrates a "poke response" message 900, which is used to acknowledge the poke request message 800. In the illustrated embodiment, the poke response message 900 contains a header 902, with information identifying the message as a poke response, as well as information about the sending and/or receiving unit. To ensure reliability, the poke response message may also contain a CRC 904, which is used to validate the contents of the message. Alternatively, the poke response message could use a different means for data validation, such as a checksum or parity bit.

Figure 3E:
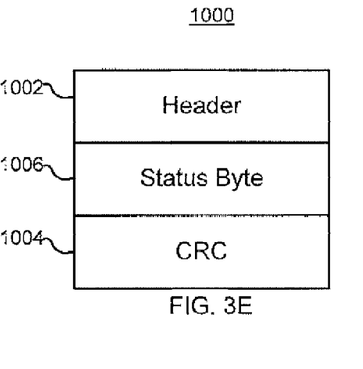

FIG. 3E illustrates another "poke response" message 1000, which is used to acknowledge the poke request message 800 and indicate that the poke was successful. In the illustrated embodiment, the poke response message 1000 contains a header 1002, with information identifying the message as a poke response, as well as information about the sending and/or receiving unit. The illustrated poke response message 1000 also includes a status byte 1006, which communicates that the poke was successful, that is, that the requested memory change had taken place. To ensure reliability, the poke response message may also contain a CRC 1004, which is used to validate the contents of the message. Alternatively, the poke response message could use a different means for data validation, such as a checksum or parity bit.

Figure 4:
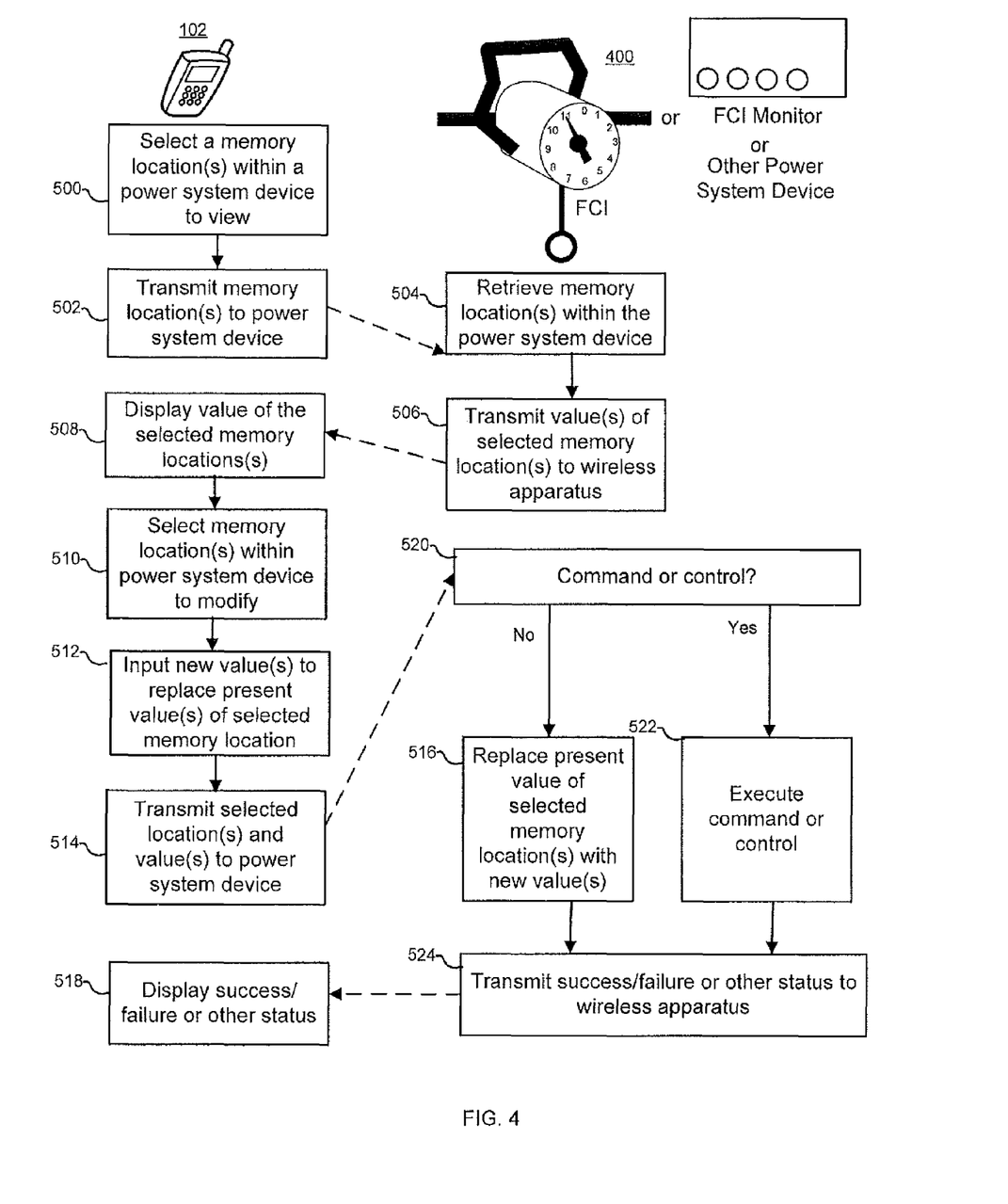
FIG. 4 is a flow chart showing how the present invention may be used to view or modify memory locations within a selected power system device in accordance with an aspect of the present invention.

As illustrated in FIG. 4, during operation the user will first identify a particular power system device that the user wishes to troubleshoot. For example, the power system device may be in the form of a faulted circuit indicator or faulted circuit indicator monitor (or other power system device) 400. As shown at 500, the user will then use the wireless device 102 to specify the device and select a particular memory location or locations within the power system device which the user wishes to view. As shown at 502, the wireless device 102 will then transmit a peek request message (e.g. a peek request for the memory location of step 500) to the power system device 400 that the user previously selected. As shown at 504, the targeted power system device 400 will retrieve the selected memory location or locations located therein. Thereafter, as shown at 506, the power system device 400 responds with a peek response message containing the contents of the memory locations the user wished to view. The wireless device 102 receives the message and displays the requested values as shown at 508. Depending on the contents of the memory location or locations that the user viewed, the user may wish to modify the contents of those locations.

To modify the contents of memory in the power system device 400, the user begins by choosing the address or addresses to modify using the wireless device 102 (as shown at 510), along with the values to place into the chosen memory locations (as shown at 512). The wireless device 102 then generates a poke request message (e.g. selected location and values), which is wirelessly transmitted to the targeted device as shown at 514. As discussed herein, the poke request message may include a command or control for the power system device 400 to execute. The power system device 400 recognizes in 520 whether the poke request message includes a command or control. If the poke request message does include a command or control, the power system device 400 executes the command or control in 522. The targeted device may further generate a poke response message in 524 including the success/failure or other status that is wirelessly transmitted to the wireless device 102. The poke response message may indicate the success of the poke. The wireless device 102 then displays the success/failure or other status in 518. If, however, the poke request does not include a command or control, the microprocessor embedded within the targeted device then processes and executes the poke request message as shown at 516. Finally, the targeted device may further generate a poke response message in 524 including the success/failure or other status that is wirelessly transmitted to the wireless device 102. The poke response message may indicate the success of the poke. The wireless device 102 then displays the success/failure or other status in 518.

In one embodiment, the poke may be followed by a peek to verify that the contents of the memory were modified as requested. To accomplish this peek sequence, the user selects a particular memory location or locations within the power system device that the user wishes to view using the wireless device 102. This will likely be the memory location(s) for which the modification was requested in the prior poke. Next, as shown at 502, the wireless device 102 will then transmit a peek request message (e.g. memory location of step 500) to the power system device 400 that the user previously selected. As shown at 504, the targeted power system device 400 will retrieve the memory location or locations located therein. Thereafter, as shown at 506, the power system device 400 responds with a peek response message containing the contents of the memory locations the user wished to view. The wireless device 102 receives the message and displays the contents of the message as shown at 508. The wireless device 102 may compare the contents of the memory locations requested with the requested modification and indicate to the user whether the requested modification did occur.

In yet another embodiment, either the peek or poke message could include any data related to the faulted circuit indicator or the power system associated therewith. For example, the message could contain information relating to the location of the faulted circuit indicator or the location of a condition in the power system. In one embodiment, the message could include data relating to the GPS location of the faulted circuit indicator or the GPS location of a fault on a transmission line.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

The invention claimed is:

1. A method for wirelessly modifying memory locations within a power system device comprising the steps of:
   i) selecting a memory location within the power system device to modify using a wireless device;
   ii) inputting into the wireless device a new value to replace the present value within the selected memory location;
   iii) transmitting the selected memory location and the new value to the power system device; and
   iv) replacing the present value within the selected memory location of the power system device with the new value
   v) wirelessly viewing memory locations within the power system device by:
      transmitting the selected memory location from the wireless device to the power system device;
      retrieving a value of the selected memory location within the power system device;
      transmitting the value of the selected memory location to the wireless device; and
      displaying an indication that the new value replaced the present value.

2. The method of claim 1, further comprising the step of transmitting a response from the power system device to the wireless device.

3. The method of claim 2, wherein the response includes an indication that the new value replaced the present value.

4. A system for wirelessly modifying memory locations within a power system device comprising:
   i) a wireless device including:
      (1) an input mechanism adapted to accept input from a user indicating an address and further adapted to accept input from a user indicating a value the user wishes the address to contain;
      (2) a first radio frequency transmitter for transmitting a first signal indicating the address within the power system device the user wishes to modify and the value the user wishes the address to contain, the value corresponding to a command or control the user wishes the power system device to perform; and
   ii) a power system device including:
      (1) a first radio frequency receiver for receiving the first signal;
      (2) a processor coupled to the first radio frequency receiver which communicates the first signal to the processor, wherein the processor performs the command the user wishes the power system device to perform,
   wherein the power system device only performs the command if the address is a predetermined address.

5. The system of claim 4, wherein the power system device is a faulted circuit indicator monitoring device.

6. The system of claim 4, wherein the first signal includes data selected from the group consisting of a header, a start address field, a number of bytes field, a data field, and a cyclical redundancy check field.

7. The system of claim 4, wherein the first signal includes an identification number of the power system device.

8. The system of claim 4, wherein the power system device further comprises a radio frequency transmitter, and wherein the wireless device further comprises a radio frequency receiver, and wherein the processor generates a second signal containing a header and a CRC field, and causes the radio frequency transmitter of the power system device to transmit the second signal to the radio frequency receiver of the wireless device.

9. The system of claim 8, wherein the second signal comprises a value placed by the processor to the memory location.

10. The system of claim 9, wherein the wireless device further comprises a display for displaying the value placed by the processor to the memory location.

11. The system of claim 8, wherein the second signal comprises a value corresponding to execution of the command or control.

12. The system of claim 11, wherein the wireless device further comprises a display for displaying the value corresponding to the execution of the command or control.

13. A system for wirelessly modifying memory locations within a power system device comprising:
   i) a wireless device including:
      (1) an input mechanism adapted to accept input from a user indicating an address and further adapted to accept input from a user indicating a value the user wishes the address to contain;
      (2) a first radio frequency transmitter for transmitting a first signal indicating the address within the power system device the user wishes to modify and the value the user wishes the address to contain, the value corresponding to a command or control the user wishes the power system device to perform; and ii) a power system device including:
  (1) a first radio frequency receiver for receiving the first signal;
  (2) a processor coupled to the first radio frequency receiver which communicates the first signal to the processor, wherein the processor performs the command the user wishes the power system device to perform, wherein the address does not correspond to a physical memory location.

14. The system of claim 13, wherein the power system device is a faulted circuit indicator monitoring device.

15. The system of claim 13, wherein the first signal includes data selected from the group consisting of a header, a start address field, a number of bytes field, and a cyclical redundancy check field.

16. The system of claim 13, wherein the first signal includes an identification number of the power system device.

17. The system of claim 13, wherein the wireless device further includes a display for viewing the value of the memory location transmitted from the second radio frequency transmitter.

* * * * *